(12) United States Patent
Casal

(10) Patent No.: US 8,804,893 B2
(45) Date of Patent: Aug. 12, 2014

(54) METHOD OF AND AN APPARATUS FOR MONITORING THE OPERATION OF A NUCLEAR REACTOR

(75) Inventor: Juan Casal, Västerås (SE)

(73) Assignee: Westinghouse Electric Sweden AB, Vasteras (SE)

(*) Notice: Subject to any disclaimer, the term of this patent is extended or adjusted under 35 U.S.C. 154(b) by 825 days.

(21) Appl. No.: 12/989,114

(22) PCT Filed: May 28, 2009

(86) PCT No.: PCT/SE2009/050611
§ 371 (c)(1),
(2), (4) Date: Oct. 25, 2010

(87) PCT Pub. No.: WO2009/148391
PCT Pub. Date: Dec. 10, 2009

(65) Prior Publication Data
US 2011/0058636 A1    Mar. 10, 2011

(30) Foreign Application Priority Data
Jun. 4, 2008   (SE) .................................... 0801323

(51) Int. Cl.
*G21C 17/00* (2006.01)
*G21C 17/04* (2006.01)

(52) U.S. Cl.
CPC .............. *G21C 17/04* (2013.01); *G21C 17/002* (2013.01); *Y02E 30/40* (2013.01)
USPC ...................................................... 376/250

(58) Field of Classification Search
CPC ....... Y02E 30/40; G21C 17/002; G21C 17/04
USPC ...................................................... 376/250
See application file for complete search history.

(56) References Cited

U.S. PATENT DOCUMENTS 5,108,694 A * 4/1992 Stucker .......................... 376/245
5,537,450 A * 7/1996 Asay et al. ..................... 376/253
(Continued)

FOREIGN PATENT DOCUMENTS

CA    1016275      8/1977
JP    54884297 A   11/1973
(Continued)

OTHER PUBLICATIONS

English translation of Japanese Office Action issued in corresponding Japanese Patent Application No. 2011-512413 dated Jul. 23, 2013.

(Continued)

*Primary Examiner* — Frank J McGue
(74) *Attorney, Agent, or Firm* — MKG, LLC

(57) ABSTRACT

The invention concerns a method of monitoring the operation of a reactor of a nuclear plant. The reactor is operated at a given total reactor power during a normal fuel operation cycle. The radioactivity level in the off-gas stream is continuously measured to detect a possible release of fission gases from the fuel rods as a consequence of a fuel leakage due to a defect on the cladding of any of the fuel rods in any of the fuel assemblies. An instantaneous power distribution is regularly established in the core and a power distribution pattern over time is established based on the instantaneous power distributions. The release of fission gases and the established power distribution pattern are then combined and correlations between changes in the release of fission gases and in the power distribution pattern are observed in order to determine a position of the defect.

8 Claims, 3 Drawing Sheets

(56) References Cited

U.S. PATENT DOCUMENTS

| | | | |
|---|---|---|---|
| 6,408,041 B2 * | 6/2002 | Hirukawa | 376/254 |
| 2003/0128793 A1 | 7/2003 | Karino et al. | |
| 2006/0146973 A1 * | 7/2006 | Yeager et al. | 376/251 |

FOREIGN PATENT DOCUMENTS

| | | |
|---|---|---|
| JP | H1130689 A | 2/1999 |
| JP | 2001133580 A | 5/2001 |
| JP | 2006189435 A | 7/2006 |
| JP | 2006317262 A | 11/2006 |
| WO | 2001039207 A1 | 5/2005 |
| WO | 2005122183 A1 | 12/2005 |

OTHER PUBLICATIONS

Supplementary European Search Report from corresponding European Patent Application No. 09758618, dated Apr. 15, 2014.

* cited by examiner

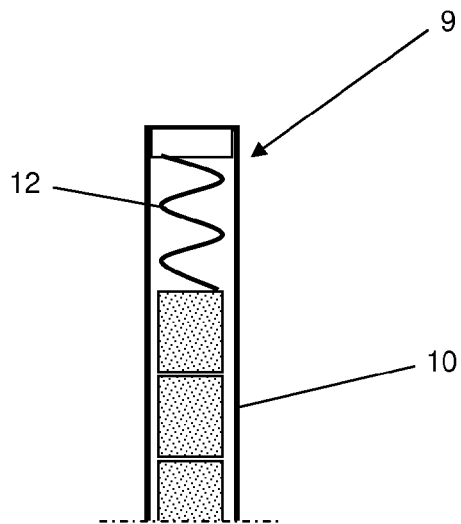
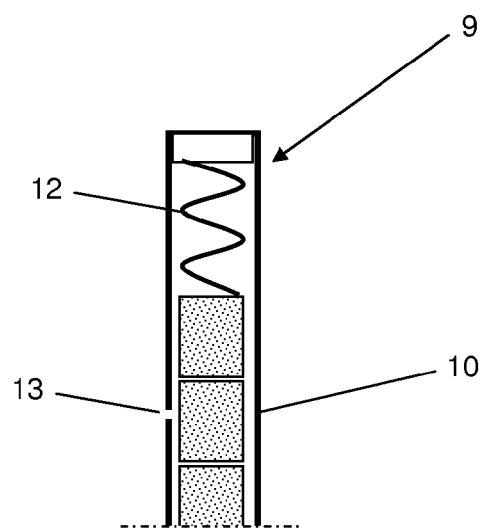
FIG. 2a
FIG. 2b

METHOD OF AND AN APPARATUS FOR MONITORING THE OPERATION OF A NUCLEAR REACTOR

FIELD OF THE INVENTION

The present invention concerns a method of monitoring the operation of a reactor of a nuclear plant, in which the reactor comprises a core having a plurality of fuel assemblies, wherein each fuel assembly includes a plurality of fuel rods, wherein each fuel rod comprises nuclear fuel and a cladding, the nuclear fuel being enclosed by the cladding, the plant also comprising forcing means arranged to force a coolant in a flow through the reactor and the core, and conveying means arranged to convey an off-gas stream from the coolant, wherein the method comprises the steps of; operating the reactor during a normal fuel operation cycle at a given total reactor power, during which fission gases are produced in the fuel rods; continuously measuring during the normal fuel operation cycle a radioactivity level in the off-gas stream for detecting a possible release of fission gases from the fuel rods as a consequence of a fuel leakage due to a defect on the cladding of any of the fuel rods in any of the fuel assemblies, and regularly establishing an instantaneous power distribution in the core during the normal fuel operation cycle and establishing a power distribution pattern based on the instantaneous power distributions over time during the normal fuel operation cycle. The invention also concerns an apparatus for monitoring the operation of a reactor of a nuclear plant, and a nuclear plant.

BACKGROUND

As mentioned above a reactor of a nuclear plant comprises a core with a plurality of fuel assemblies. The fuel assemblies are vertically distributed and each fuel assembly contains a plurality of fuel rods. Each fuel rod comprises a cladding which encloses the nuclear fuel in the form of pellets. Common nuclear fuel material is uranium and/or plutonium. During the normal operation of the nuclear plant the nuclear fuel in the fuel rods is burned up, leading to the formation of fission gases that comprise radioactive inert gases. These fission gases normally stay inside the fuel rods.

The environment inside the reactor is demanding for the components positioned therein. The environment is for example highly oxidative and the components are exposed to strong radiation. Furthermore, the generated power inside the reactor is not uniformly distributed throughout the core and some parts are exposed to higher local power levels than other parts. The local power levels may vary for example when a control rod is moved or the water flow and/or the water temperature is changed. The nuclear power producers constantly aim at producing more power, i.e. increasing the effectiveness of the nuclear plant. It is for example desirable to run the fuel assemblies for as long operation cycles as possible to reduce the outage time for refueling. There are however certain limits in the operating conditions of the nuclear plant that are not to be exceeded, to avoid damaging the fuel, and these limits must therefore be carefully monitored.

Sometimes during normal operation of the nuclear plant a defect in the cladding of a fuel rod appears. Such a defect may lead to the release of the above mentioned fission gases produced inside the fuel rod. The defect can be of a primary or a secondary nature. A primary defect is the first defect that appears on the cladding. It can appear due to for example mechanical wear or a local power hot spot and is normally a small hole or crack in the cladding. The primary defect may over time develop into a secondary defect which is a larger hole or crack in the cladding. A secondary defect may lead to serious damage on the cladding and eventually a failure of the fuel rod, which in turn may lead to a release of nuclear fuel material into the reactor water. A single fuel rod failure in a fuel assembly could lead to exceeding the allowed radioactivity levels in the coolant, forcing a shutdown of the nuclear plant. Hence, as mentioned above, it is important to monitor the nuclear plant and to be able to effectively locate fuel assemblies containing defect fuel rods either for their removal or for modifying the plant operation to avoid a secondary defect. A fuel assembly containing a defect fuel rod must be removed in order to prevent a total failure of the reactor.

One way of monitoring the operation of a nuclear reactor is to use a system that detects the release of fission gases from the fuel assemblies. These kinds of systems are sometimes called activity monitoring systems. The release of fission gases is an indication that a defect on a fuel rod has appeared. The nuclear plant can however continue to be run by for example reducing the power in the part of the reactor where the fuel assembly containing the defect fuel rod is positioned. The fuel assembly in question may thereafter be removed when the operation cycle is over and the reactor is shut down to be charged with new nuclear fuel.

To be able to continue running the nuclear plant it is therefore important to find out in what part of the reactor the defect has appeared. A well-known way of doing this is by a method called flux-tilting or power suppression testing, described in U.S. Pat. No. 5,537,450 A. Flux-tilting involves the movement of control rods up and down in the reactor. A control rod is made of a material that is able to absorb neutrons without fissioning itself. The control rods are therefore able to slow down the fission of the nuclear fuel and thereby reduce the power generated in its vicinity. The control rods are distributed throughout the core of the reactor and can be independently moved up and down to control the power in different positions of the core.

In the flux-tilting method the control rods are moved up and down in the core of the reactor and at the same time the off-gas stream from the reactor is analyzed for the detection of fission gases. When a control rod is inserted further into the core the power is reduced. When that control rod is then pulled out from the core the power is increased and more fission gases are produced in the fuel rods leading to a higher release of fission gases through a possible defect. By independently moving control rods at different positions it is in this way possible to locate in what part of the core the defect has appeared.

Flux-tilting is however not free of risks as the method itself may lead to a higher risk of a secondary defect due to local power changes. Therefore flux-tilting should be carried out at reduced reactor power. A reduced reactor power results in a decrease of the effectiveness of the nuclear power plant and, hence, a production loss.

A further way of monitoring the operation of a nuclear plant would be to use the information available from a system that continuously calculates the power distribution in the core of the reactor. The calculations could be made by advanced computer programs that use a number of measured process parameters obtained from the core. Such calculations may result in three dimensional power distribution patterns showing power peaks and power depressions for different positions of the core. The system would render it possible to make comparisons over time in order to observe where changes in the power take place. It is possible to infer the location of a defect on a fuel rod by observing these power changes, but some defects on the fuel rods appear without any prior change in the fuel assembly output power, such as those caused by mechanical wear.

SUMMARY OF THE INVENTION

A purpose of the present invention is to provide improved monitoring of the operation of a reactor of a nuclear plant in order to find out if a defect on any of the fuel rods has appeared, and to localize the defect, and to find a position of the fuel assembly comprising the fuel rod comprising the defect.

A method for accomplishing this comprises combining the release of fission gases and the established power distribution pattern, and observing correlations between changes in the release of fission gases and in the power distribution pattern in order to determine a position of the defect on the cladding of any of the fuel rods.

The method of the present invention can include combining data from a system for detecting the release of fission gases and data from a system that establishes a power distribution pattern to find a position of a possible defect on a fuel rod in the reactor. The method finds use during the normal operation of the nuclear plant and at its normal given total reactor power. Accordingly, no reduction of power is necessary to perform the method and, hence, no production loss is experienced during the normal operation and the performance of the method. With information obtained from the method several preventive actions may be taken to reduce the risk for a discovered primary defect to develop into a secondary defect. These actions may involve a power reduction or an unchanged power in the part of the reactor where the defect is found, without the need for a flux-tilting test. It is also possible to perform a reduced flux-tilting test in the part of the reactor where the defect is most likely to be found. Furthermore, the information may be used to perform a flux-tilting test at a normal given total reactor power but with a reduced movement of the control rods, leading to a lower production loss compared to a flux-tilting test performed at reduced power.

Preferably, the correlations comprise local changes in the power distribution pattern followed by a release of fission gases.

Preferably, the correlations comprise local changes in the power distribution pattern followed by an increase in an on-going release of fission gases. E.g. a local power increase followed by a substantially immediate release of fission gas is a correlation which may indicate a defect in the area of the local power increase.

Preferably, the plant comprises a core simulator which calculates local power levels at different positions in the core, the calculated local power levels being used to establish the instantaneous power distributions and the power distribution pattern.

Preferably, the calculated local power levels are calculated by simulation models, the simulation models using core input signals comprising power affecting factors.

Preferably, the power affecting factors comprise process parameters including the given total reactor power, the flow of the coolant and the temperature of the coolant at least in one position of the reactor.

Preferably, local power levels are sensed by means of sensors at different positions in the core.

Preferably, the sensed local power levels are compared to the calculated local power levels, whereby a recalculation and correction of the power distribution pattern is performed to establish a corrected power distribution pattern if the sensed local power levels and the calculated local power levels do not correspond.

Preferably, each sensor comprises a local power range monitor or an equivalent device. The local power range monitor can periodically be calibrated by a traverse incore probe or an equivalent device.

Preferably, the sensors regularly measure at least one of a local neutron flux and a local gamma flux.

The present invention is also directed in one aspect to a monitoring device comprising; at least one first detector configured to measure continuously, during the normal fuel operation cycle, a radioactivity level in the off-gas stream in order to detect a possible release of fission gases from the fuel rods as a consequence of a fuel leakage due to a defect on the cladding of any of the fuel rods; a core simulator configured to establish regularly an instantaneous power distribution in the core during the normal fuel operation cycle, and to establish a power distribution pattern based on the instantaneous power distributions over time during the normal fuel operation cycle, and a processor configured to determine a position of the fuel assembly comprising the defect on the cladding of any of its fuel rods by combining the release of fission gases and the established power distribution pattern and by observing correlations between changes in the release of fission gases and the power distribution pattern.

According to an embodiment of the invention, the core simulator is configured to calculate local power levels at different positions in the core and to establish the power distribution pattern based on the calculated local power levels.

According to another embodiment, the monitoring device comprises sensors provided at different positions in the core and configured to sense local power levels at different positions in the core.

According to a further embodiment, the monitoring device comprises a comparator configured to compare the sensed local power levels to the calculated local power levels, whereby the core simulator is configured to recalculate and correct the power distribution pattern to establish a corrected power distribution pattern if the sensed local power levels and the calculated local power levels do not correspond.

According to a further embodiment, each sensor comprises a local power range monitor. The local power range monitor can periodically be calibrated by a traverse incore probe.

According to a further embodiment, the sensors are configured to measure regularly at least one of a local neutron flux and a local gamma flux.

BRIEF DESCRIPTION OF THE DRAWINGS

FIG. 2a schematically shows a fuel rod enclosing nuclear fuel.

FIG. 2b schematically shows a fuel rod enclosing nuclear fuel.

DESCRIPTION OF EMBODIMENT EXAMPLES

Figure 1:
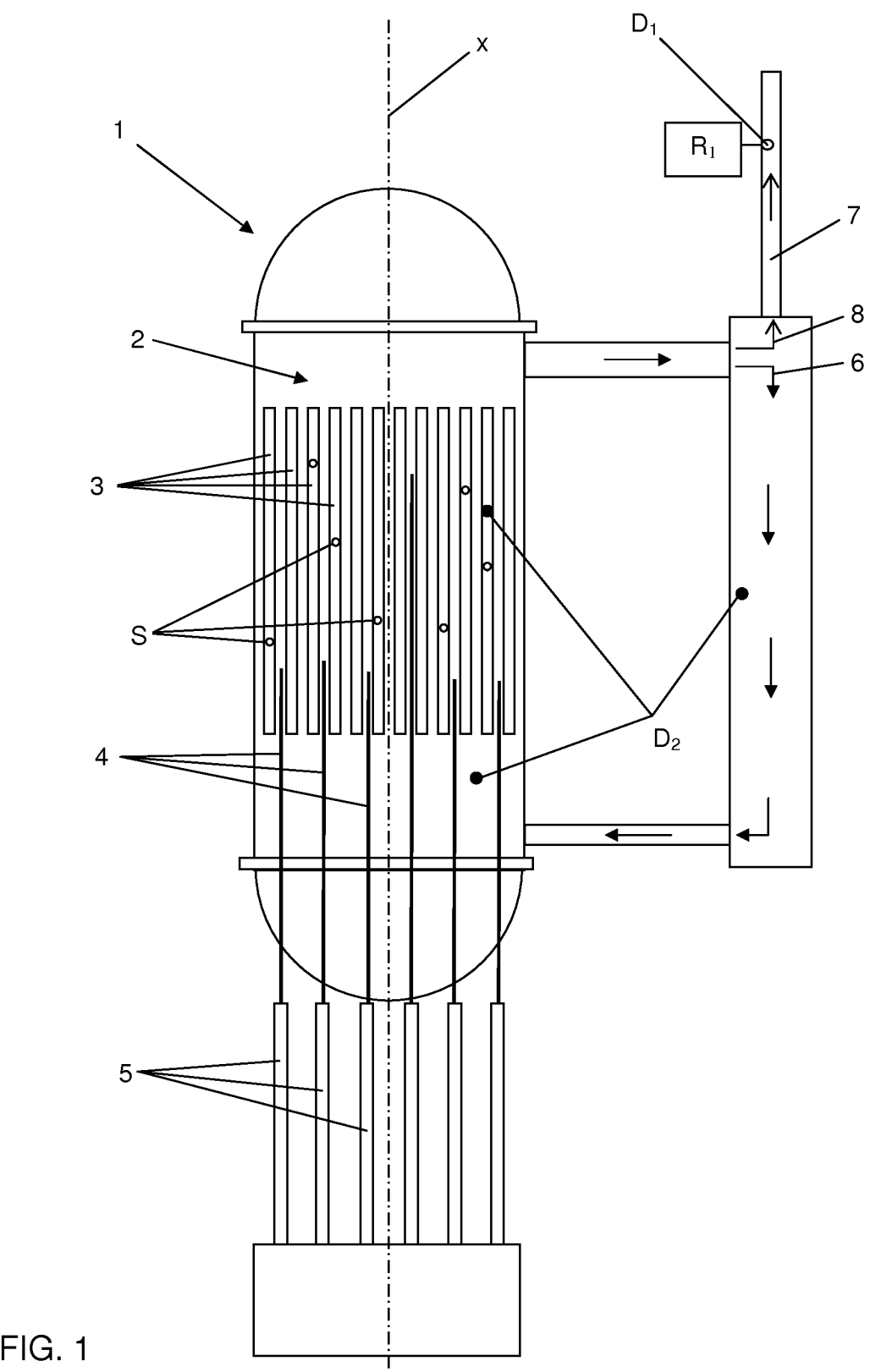
FIG. 1 schematically shows a nuclear plant comprising a reactor.

An embodiment of a nuclear reactor to be monitored by the method according to the invention will first be described with reference to FIG. 1. The invention is applicable to light water reactors, such as a boiling water reactor, BWR, or a pressurized water reactor, PWR. FIG. 1 shows part of a nuclear plant.

The nuclear plant comprises a reactor 1. The reactor 1 comprises a core 2 having a plurality of fuel assemblies 3. Each fuel assembly 3 includes a plurality of fuel rods (not shown), see FIG. 2a. The reactor 1 further comprises control rods 4. The control rods 4 are located between the fuel assemblies 3 and are connected to drive members 5. The drive members 5 are able to move the control rods 4 up and down in a vertical direction x into and out from a respective position between the fuel assemblies 3.

The nuclear plant also comprises forcing means arranged to force a coolant 6 in a flow through the reactor 1 and the core 2. Furthermore, the nuclear plant comprises conveying means 7 arranged to convey an off-gas stream 8 from the coolant 6. A first detector $D_1$ for measuring the radioactive activity in the off-gas stream 8 is located in the conveying means 7. Furthermore, a first recorder $R_1$ is connected to the first detector $D_1$. The first recorder $R_1$ records, and possibly stores, the radioactive activity in the off-gas stream 8 measured by the first detector $D_1$.

The core 2 of the reactor 1 further comprises sensors S evenly distributed throughout different positions in the core 2. The sensors S, which are in-core instrumentation, sense local power levels in the core 2. Furthermore, the reactor 1 comprises various second detectors $D_2$ localised at different positions in the core 2. The second detectors D2 measure process parameters such as the given total reactor power, the flow of the coolant and the temperature of the coolant. The process parameters are used to calculate local power levels at different positions in the core 2.

FIG. 2a discloses a fuel rod 9 for the nuclear plant according to the invention. The fuel rod 9 comprises a cladding 10 and nuclear fuel pellets 11. The cladding 10 encloses the nuclear fuel pellets 11. A spring 12 holds the nuclear fuel pellets 11 in place.

FIG. 2b discloses a fuel rod 9 similar to the one in FIG. 2a, with the difference that the cladding 10 has a defect 13, e.g. a primary defect.

Figure 3:
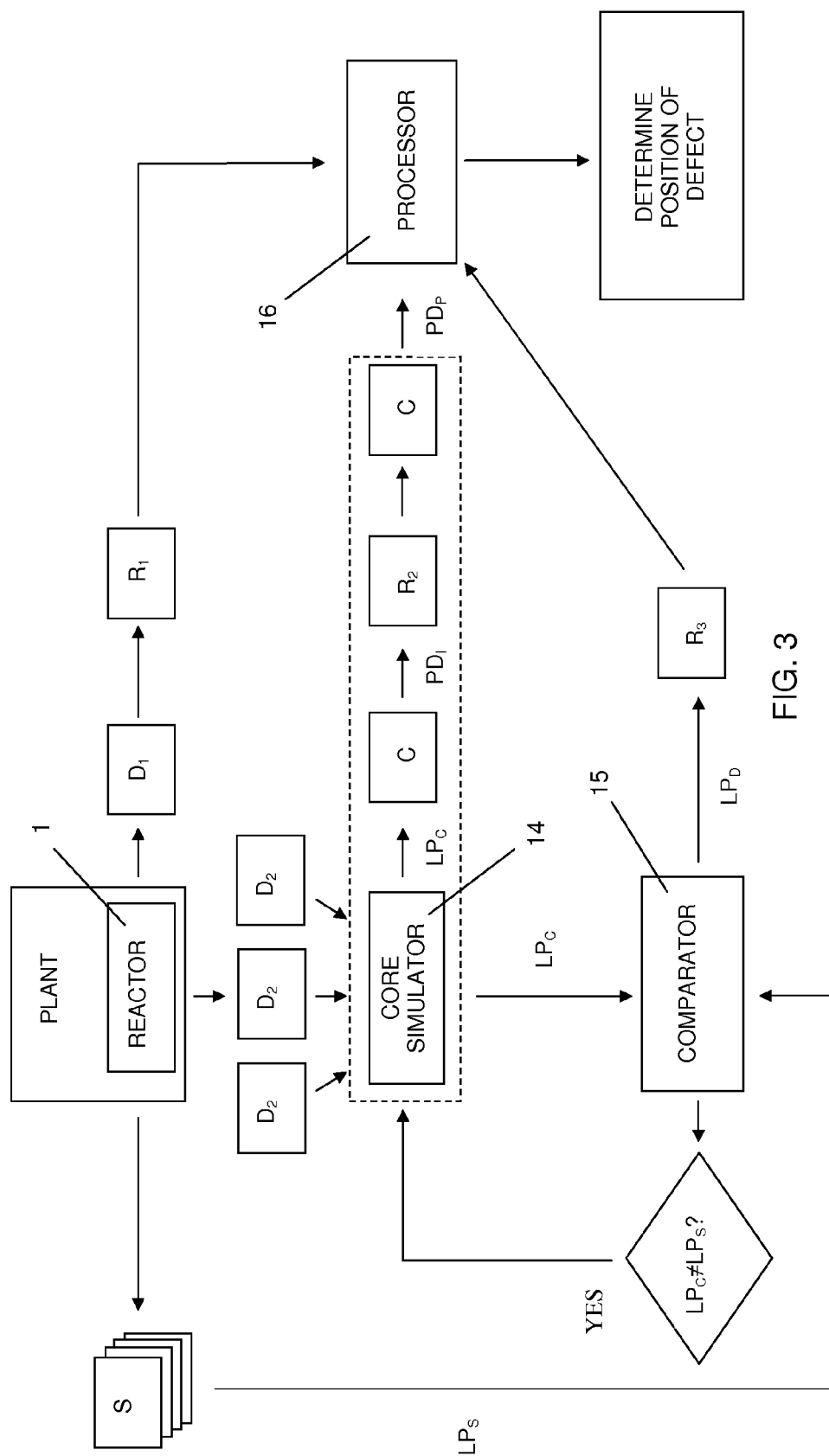
FIG. 3 is a flow chart of an embodiment of a method according to the present invention.

FIG. 3 is a flow chart illustrating the method of monitoring the operation of a nuclear reactor according to an example of the present invention by means of a monitoring device comprising the components disclosed in FIG. 3. It is referred to FIG. 1 for an illustration of a nuclear plant according to an embodiment of the invention. During the normal operation cycle of the nuclear plant an off-gas stream, which may contain fission gases due to a defect on the cladding of any of the fuel rods, is monitored, whereby possible fission gases are detected and measured by at least one first detector $D_1$. The first detector $D_1$ is configured to measure continuously a radioactivity level in the off-gas stream. The measurements are recorded by a first recorder $R_1$. Simultaneously, sensors S, evenly distributed throughout the core 2 of the reactor 1, sense local power levels $LP_S$ at different positions of the core 2. Furthermore, a number of second detectors $D_2$ measure process parameters such as the given total reactor power, the flow of the coolant and the temperature of the coolant. The process parameters are used by a core simulator 14 to calculate local power levels $LP_C$ at different positions in the core 2 of the reactor 1. The core simulator 14 divides each fuel assembly 3 into for example about 25 calculation nodes. Normally, a reactor in a nuclear plant of the type described for the present invention comprises about 400-900 fuel assemblies, resulting in thousands of calculation nodes. The core simulator 14 calculates local power levels $LP_C$ for each of these calculation nodes.

A comparator 15 compares the sensed local power levels $LP_S$ to the calculated local power levels $LP_C$. If the calculated local power levels $LP_C$ do not correspond to the sensed local power levels $LP_S$, the difference between the calculated local power levels $LP_C$ and the sensed local power levels $LP_S$ is calculated. A recalculation and correction of the calculated local power levels $LP_C$ is thereafter performed by the core simulator 14.

The sensors S are provided in the method and the monitoring device to sense the actual local power levels while the calculated local power levels $LP_C$ are an estimation of the actual local power levels made by the core simulator 14. The sensed local power levels $LP_S$ are used to correct the calculated local power levels $LP_C$ but the sensors S in the core 2 are few and some of them might not be operational continuously. The core simulator 14 is in contrast to this able to calculate the local power levels $LP_C$ continuously and in every calculation node of the fuel assemblies 3 of the core 2. The sensors S can advantageously be local power range monitors.

When the local power levels $LP_C$ have been calculated and optionally recalculated by the core simulator, a calculator C establishes instantaneous power distributions $PD_I$. The instantaneous power distributions $PD_I$ are recorded over time by a second recorder $R_2$. Finally, the calculator C establishes a power distribution pattern $PD_P$ based on the recorded instantaneous power distributions $PD_I$. The power distribution pattern $PD_P$ is advantageously illustrated in three dimensions, showing local power peaks and local power depressions and how they change over time.

The instantaneous power distributions $PD_I$ are established everytime any of the above mentioned process parameters changes its value. A process parameter value change can for example take place due to a movement of one of the control rods 4. If no process parameter changes its value within a predetermined time, normally about 15 minutes, an automatic establishment of the instantaneous power distribution $PD_I$ takes place.

The recordings from the measurements of the radioactivity level in the off-gas stream and the established power distribution pattern $PD_P$ are combined in a processor 16. The processor 16 is configured to determine a position for the defect 13 on the cladding 10 of any of the fuel rods 9 by combining the release of fission gases and the established power distribution pattern $PD_P$, and by observing correlations in time between changes in the release of fission gases and the power distribution pattern $PD_P$.

According to the above, if a release of fission gases occurs due to a local power change, the information concerning where and when the local power change occurred helps in determining a position of the defect 13. If the time required for the fission gases to be transported from the core 2 to the first detector $D_1$ is known, it is possible to search the established power distribution pattern $PD_P$ in order to find local power changes that occurred at the same time as the fission gas release. Everytime a change in the release of fission gases is recorded, a correlation to the power distribution pattern $PD_P$ is made. Normally, a number of local power changes occur at the same time as the change in the fission gas release occurs, but for each correlation a more likely position of the defect 13 can be determined.

If, on the other hand, a local power change occurs due to a release of fission gases, the information concerning where and when the local power change occurred could be useful in determining if any of the sensors S sensed a local power change at the time of the detected release of fission gases. This case is also schematically shown in FIG. 3. As mentioned above, the comparator 15 compares the sensed local power levels $LP_S$ to the calculated local power levels $LP_C$. Differences $LP_D$ between the calculated local power levels $LP_C$ and the sensed local power levels $LP_S$ are recorded by a third recorder $R_3$. The recordings from the measurements of the radioactivity level in the off-gas stream and the recorded local power differences $LP_D$ are combined in the processor 16. The processor 16 is configured to determine a position for the defect 13 on the cladding 10 of any of the fuel rods 9 by combining the release of fission gases and the recorded local power differences $LP_D$ and by observing correlations in time between changes in the release of fission gases and changes in the recorded local power differences $LP_D$. In particular, changes in the recorded local power differences $LP_D$ that do not correspond to any changes in the reactor environment are further investigated in order to determine the position for the defect 13.

The method and the monitoring device aim at determining the position of a defect. As stated herein, the determination is at least partly based on a calculation, which means that the determined position will be the most likely position of the defect achievable by the established power distribution pattern and the release of fission gases. It is to be noted that the position could be the position of the fuel assembly 3 comprising the fuel rod 9 comprising the defect 13, the position of the fuel rod 9 comprising the defect 13 or the position of the defect 13 itself.

The present invention is not limited to the shown embodiments but can be varied and modified within the scope of the following claims.

The invention claimed is:

1. A method of monitoring the operation of a reactor of a nuclear plant, in which the reactor comprises a core having a plurality of fuel assemblies, wherein each fuel assembly includes a plurality of fuel rods, wherein each fuel rod comprises nuclear fuel and a cladding, the nuclear fuel being enclosed by the cladding, the plant also comprising forcing means arranged to force a coolant in a flow through the reactor and the core, conveying means arranged to convey an off-gas stream from the coolant, a core simulator, and sensors (S) at different positions in the core, wherein the method comprises the steps of:

operating the reactor during a normal fuel operation cycle at a given total reactor power, during which fission gases are produced in the fuel rods;

continuously measuring during the normal fuel operation cycle a radioactivity level in the off-gas stream for sensing a release of fission gases from the fuel rods as a consequence of a fuel leakage due to a defect on the cladding of any of the fuel rods in any of the fuel assemblies;

calculating calculated local power levels ($LP_C$) at different positions in the core by means of the core simulator;

regularly establishing based on the calculated local power levels ($LP_C$) an instantaneous power distribution ($PD_I$) in the core during the normal fuel operation cycle by means of the core simulator;

establishing a power distribution pattern ($PD_P$) based on the instantaneous power distributions ($PD_I$) over time during the normal fuel operation cycle by means of the core simulator;

sensing sensed local power levels ($LP_S$) by means of the sensors (S);

comparing the sensed local power levels ($LP_S$) to the calculated local power levels ($LP_C$);

recalculating and correcting the instantaneous power distribution pattern ($PD_I$) to establish a corrected power distribution pattern ($PD_P$) if the sensed local power levels ($LP_S$) and the calculated local power levels ($LP_C$) do not correspond;

combining the sensed release of fission gases and at least one of the established and the corrected power distribution pattern ($PD_P$); and determining a position of the defect on the cladding of any of the fuel rods by correlating:

changes in the sensed release of fission gases and changes in the sensed local power levels ($LP_S$), differences between the sensed local power levels ($LP_S$) and the calculated local power levels ($LP_C$), and changes in the power distribution pattern ($PD_P$).

2. A method according to claim 1, wherein the correlations comprise local changes in the power distribution pattern ($PD_P$) followed by a release of fission gases.

3. A method according to claim 1, wherein the correlations comprise local changes in the power distribution pattern ($PD_P$) followed by an increase in an on-going release of fission gases.

4. A method according to claim 1, wherein the calculated local power levels ($LP_C$) are used to establish the power distribution pattern ($PD_P$).

5. A method according to claim 4, wherein the calculated local power levels ($LP_C$) are calculated by simulation models, the simulation models using core input signals comprising power affecting factors.

6. A method according to claim 5, wherein the power affecting factors comprise process parameters including the given total reactor power, the flow of the coolant and the temperature of the coolant at least in one position of the reactor.

7. A method according to claim 1, wherein the method further comprises the steps of:

recording local power differences ($LP_D$) between the sensed local power levels ($LP_S$) and the calculated local power levels ($LP_C$);

combining the release of fission gases and the recorded local power differences ($LP_D$); and observing correlations between changes in the release of fission gases and changes in the recorded local power differences ($LP_D$) in order to determine a position of the defect on the cladding of any of the fuel rods.

8. A method according to claim 1, wherein the sensors (S) regularly measure at least one of a local neutron flux and a local gamma flux.

* * * * *